United States Patent [19]

Smyth et al.

[11] 4,375,850
[45] Mar. 8, 1983

[54] SYSTEM FOR DISPLAY AND STORAGE OF CASSETTES

[75] Inventors: William A. Smyth, Fullerton; Graydon S. Carlson, Orange; Harold J. Wilde, Fullerton, all of Calif.

[73] Assignee: Certron Corporation, Anaheim, Calif.

[21] Appl. No.: 346,223

[22] Filed: Feb. 5, 1982

[51] Int. Cl.³ .................. B65D 85/672; B65D 73/00
[52] U.S. Cl. .................. 206/387; 206/45 M; 206/462; 206/464; 206/471; 206/493
[58] Field of Search .......... 206/387, 461, 462, 463, 206/464, 465, 471, 476, 806, 45.14, 45.31, 493, 44.12; 229/16 D

[56] References Cited

U.S. PATENT DOCUMENTS

| | | | |
|---|---|---|---|
| 3,313,407 | 4/1967 | Palm, Jr. | 206/461 X |
| 3,550,769 | 12/1970 | Wolk | 206/461 |
| 3,737,067 | 6/1973 | Palson | 206/387 X |
| 3,978,985 | 9/1976 | Zinnbauer | 206/387 |

FOREIGN PATENT DOCUMENTS 1166872 11/1958 France .................. 206/463

Primary Examiner—Steven M. Pollard
Assistant Examiner—B. Gehman
Attorney, Agent, or Firm—Freilich, Hornbaker, Wasserman, Rosen & Fernandez

[57] ABSTRACT

A system is disclosed for retail display of a cassette in a box and for storage of a cassette at home or in an automobile using a flat plastic holder having a window and four protrusions into the window. These protrusions fit into holes in the box. A pair of protrusions on one side, which are longer than on the other side, are inserted into matching holes in the box. As the other side is then moved into the window, the other (shorter) pair of protrusions snap into the remaining holes in the box. The holder has an extension at one end with a hole for receiving a rod of a display rack. For storage, the holder slides into slots on the inside of a case. The extension then seves as a tab for lifting the holder out of the case.

2 Claims, 6 Drawing Figures

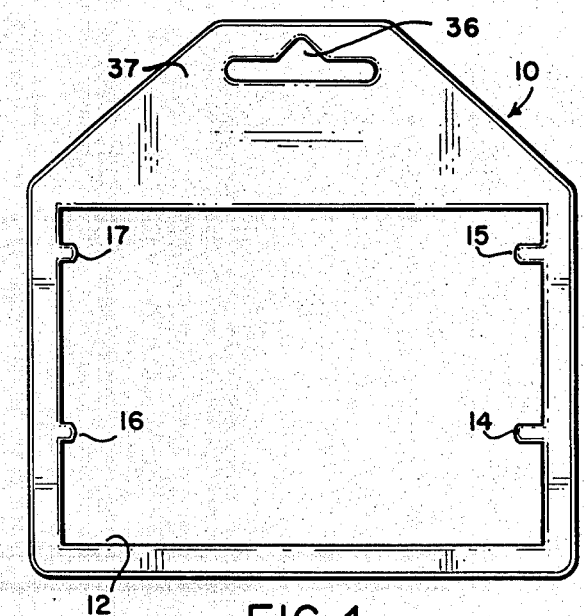
FIG. 1
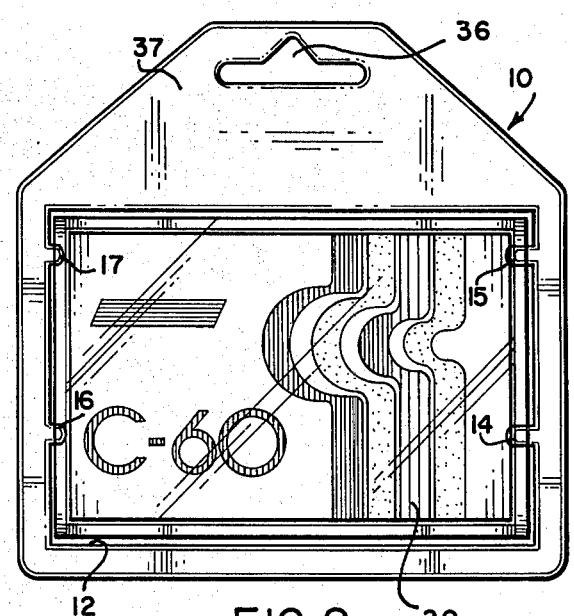
FIG. 2
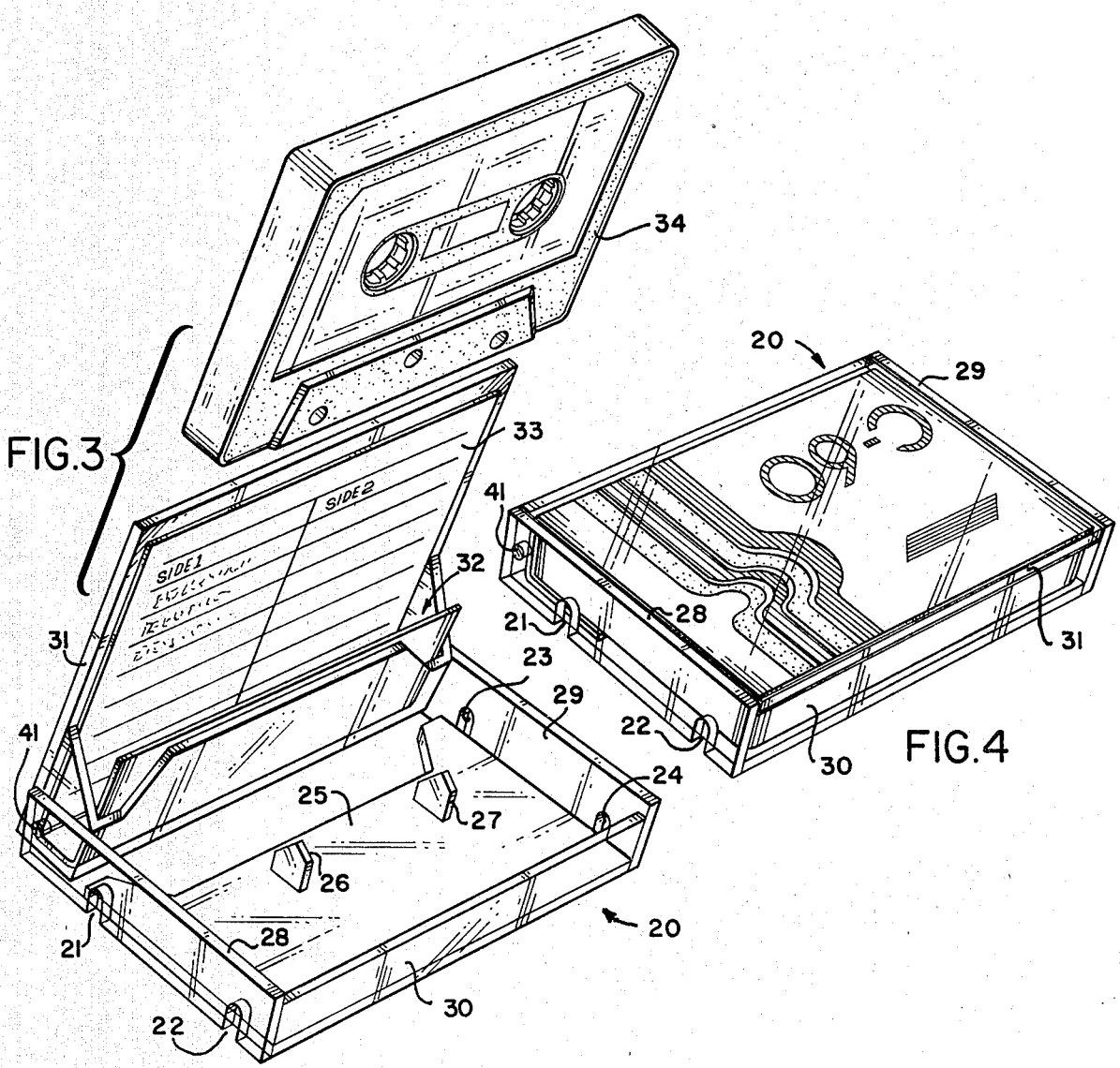
FIG. 3
FIG. 4

SYSTEM FOR DISPLAY AND STORAGE OF CASSETTES

BACKGROUND OF THE INVENTION

This invention relates to a system for retail display and storage of standard cassettes.

A plastic box, commonly referred to as a "Norelco or Philips box," (hereafter referred to as the box) was originally designed and adopted by the industry for prerecorded cassettes. It is now often used for blank cassettes sold at retail outlets. The box with an insert card and/or cardboard sleeve plus a thin transparent wrapping thus serves as a retail package. After purchase, the box serves as a storage box for the cassette. On the reverse side of the insert card is an index card which is normally used for listing what has been recorded.

Another form of retail packaging in common use, particularly in selling cassettes in groups of two or three cassettes, is to mount the cassettes on a card with transparent plastic shrink wrapped over the cassettes. Still another form of packaging again uses a card with a transparent cover molded to fit over the cassettes. The edges of this molded plastic are then cemented onto the card. In either case, a hole in the card at one end serves to hang the cards on a retail display rack.

OBJECTS AND SUMMARY OF THE INVENTION

An object of this invention is to provide a box holder for use on display racks in retailing cassettes. A further object is to provide a box holder for use in storage of cassettes. In accordance with the present invention, the same box holder used for retail display on a rack serves as a holder for storage of cassettes in boxes. It is comprised of a flat sheet having a window for receiving a box. The box has a pair of holes at each end near a base of a structure adopted to receive a cassette. The holes are spaced to receive nibs protruding from the holder into the window. The nibs on one side are longer than on the other side. These longer nibs are inserted into holes of a box first. The other shorter pair of nibs are then snapped into the remaining holes of the box on the other end. A tab is provided on the holder with a hole for receiving a rod of a display rack, and a storage case is provided with slots for later receiving the sides of holders. The tab of a holder is then used for lifting the holder out of the storage case. Two or more such boxes may be displayed and stored in a single extended holder by simply providing a separate window for each box, each one below or beside the other.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a front view in elevation of a box holder in accordance with the present invention.

FIG. 2 shows a box with a cassette held therein for display or storage.

FIG. 3 shows a box opened to receive a cassette.

FIG. 4 shows the box of FIG. 3 closed and ready to be inserted into the holder of FIG. 1 as shown in FIG. 2.

DESCRIPTION OF PREFERRED EMBODIMENTS

Figure 5:
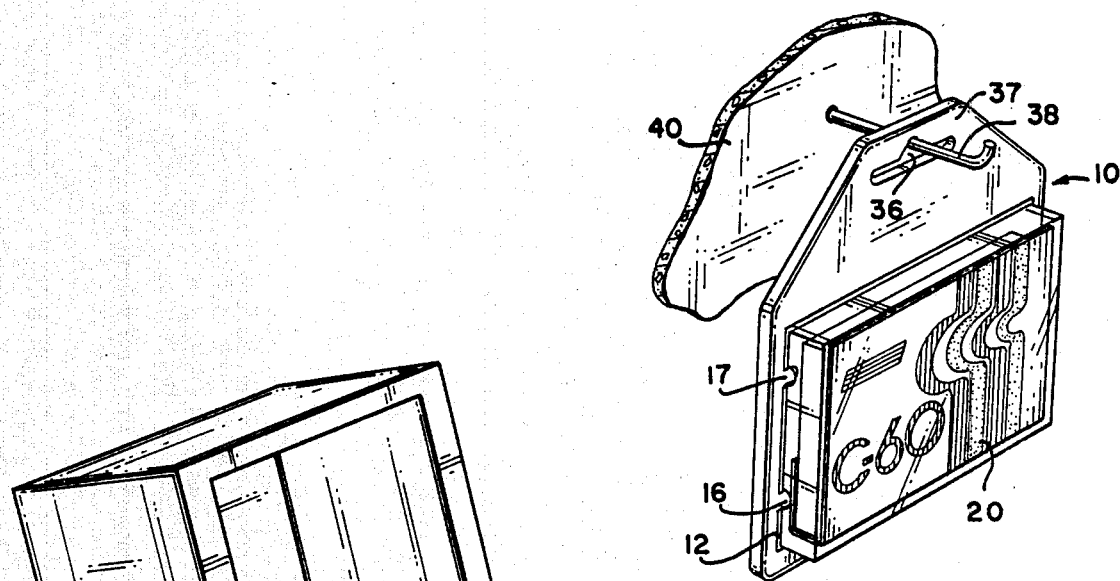
FIG. 5 shows the manner in which the loaded holder of FIG. 2 is placed on a rod of a display rack at a retail outlet.

Referring to FIG. 1 of the drawings, a flat molded holder 10 is provided with a window 12 having two pairs of protruding nibs 14, 15 and 16, 17. The second pair of nibs are purposely shorter than the first pair in order that when the first pair are inserted into holes at one end of a box 20 (shown in the holder in FIG. 2, and separately in FIGS. 3 and 4), the second shorter pair snap into holes on the other end of the box. The holes at the one end are indicated by the reference numerals 21 and 22 in FIGS. 3 and 4. The holes at the other end are indicated by the reference numerals 23 and 24 in FIG. 3.

The box 20 shown open in FIG. 3 is comprised of a base 25 having protrusions 26 and 27, end walls 28 and 29, and a single side wall 30. Pivoted at the side opposite the wall 30 is a cover 31 having along the pivoted side a pocket 32 which receives an index card 33, and a standard cassette 34. When the cassette has been seated into the pocket of the cover, the cover is closed over the side wall 30. Note that the height of the side wall 30 is less than the end walls by the thickness of the cover 31 so that it fits flush between the end walls when closed, as shown in FIG. 4.

As originally designed for sale of prerecorded cassettes, the box has only the holes 22 and 24 near the side wall 30 (for some unknown purpose). All that is usually of interest is that the box have the protrusions 26 and 27 extending from the base 25 to engage drive sprockets of the tape reels in the cassette. That prevents tape from unwinding from either reel while the cassette is stored in the box. But the holes 22 and 24 are of particular interest in the present invention, along with holes 21 and 23 added a sufficient distance from the side opposite the side wall 30 to be clear of the structure of the pocket 32, a distance of about one inch for a pocket of the configuration shown, which is conventional.

Figure 6:
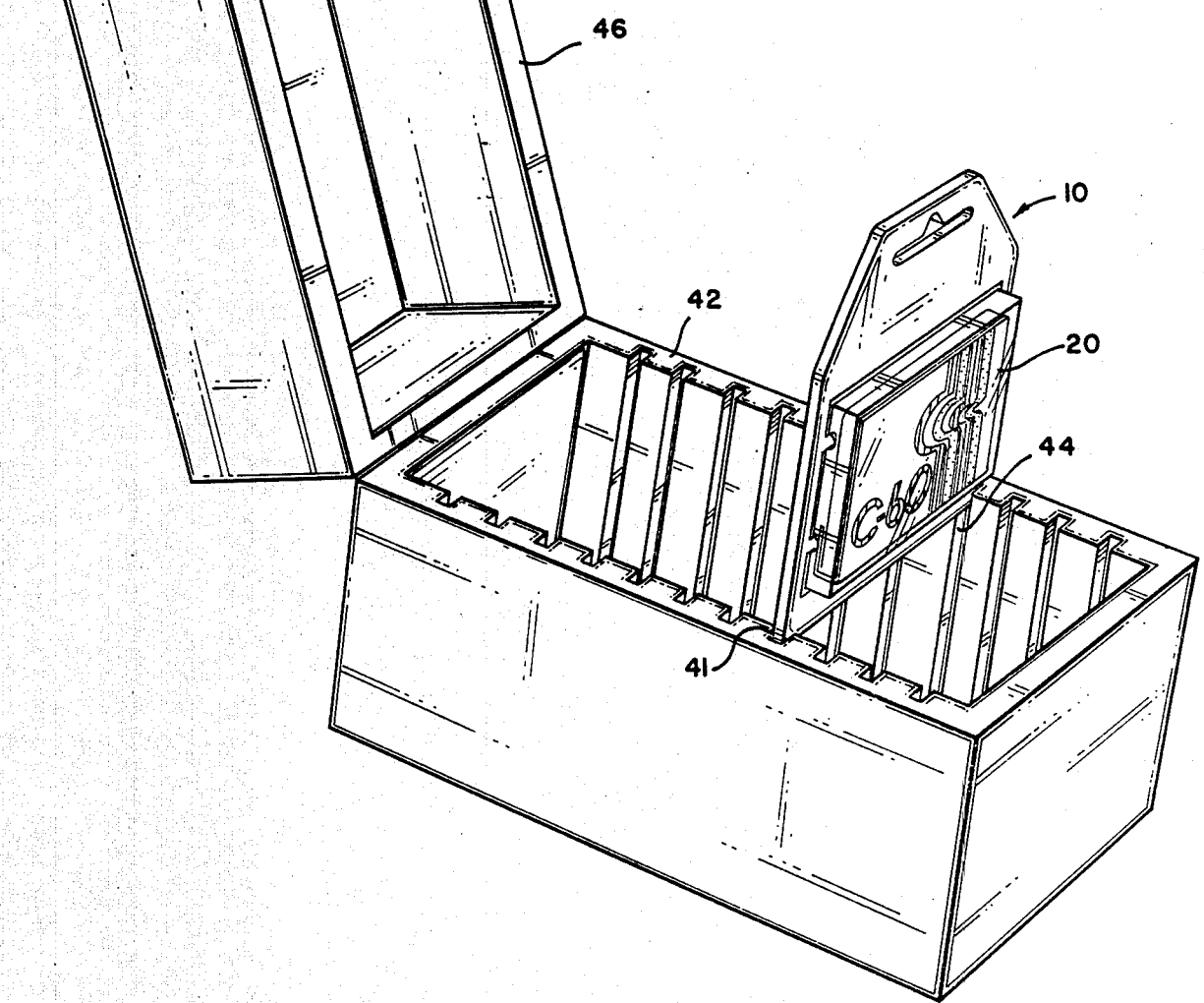
FIG. 6 shows the manner in which the loaded holder of FIG. 2 is placed in slots of a case for storage.

It should be noted that all of the holes in the end walls 28 and 29 are near the base 25, and are formed by U-shaped slots extending from the lower edges of the end walls to a sufficient distance above the base 25 to leave distinct holes, as best seen in FIG. 3 in respect to the pair 23 and 24. Once the longer nibs 14, 15 of the holder 10 are inserted into the holes 21 and 22 from in front of the holder (or above as viewed in FIG. 4), the other pair of protrusions 16, 17 can be snapped into holes 23 and 24 to retain the box in the window 12 of the holder 10 as shown in FIG. 2 with the majority of the box in front (or above) the base of the box, as shown in FIGS. 5 and 6. The box is thus in full view in front of the holder for display purposes. A hole 36 is provided in a tab 37 of the holder to receive a rod 38 extending from a display rack 40, as shown in FIG. 5.

It is advantageous for the majority of the box to be in front of the base so that the box can be opened while it is still in the holder to remove or replace a cassette. This is possible because pivot pins of the cover, such as pin 41 shown in FIGS. 3 and 4 are well in front (or above) the base. The cover 31 may then pivot until the edge of the cover opposite the side wall 30 butts against the holder. This permits the cassette to be removed from the box without removing the box from the holder. This advantage is useful when the holder is serving to store the cassette in its box inside a case as shown in FIG. 6. The case is comprised of a box 42 with internal slots 44, 45 on opposite walls of sufficient width to receive the holder. A cover 46, which may be hinged to the box 42 completes the storage case. The tab 37 of the holder 10 is used for lifting the holder out of the case. It is then that the user may wish to remove the cassette from the box without removing the box from the holder. The holder and box may be returned to the case while the cassette is in use.

The longer nibs 14, 15 are preferably about 6 mm long, while the shorter nibs 16, 17 are about half that length. The window is made about 1 mm longer than the box, and the thickness of at least the end wall 29 having the holes 21 and 22 that receive the shorter nibs 16 and 17 are about 2 mm. Consequently, when the longer nibs 14 and 15 have been inserted into the holes 21 and 22 in the end wall 28, the box can be butted against the side of the window 12 having the longer nibs to provide a total of about 3 mm clearance for the shorter nibs to snap into the U-shaped channels in the end wall 29 past the base 25. When the box is then released from the users hand, the shorter nibs will extend past the base 25 to hold the box in the frame. To remove the box from the frame, the process is reversed. It is thus evident that the frame need not be pliant, and may in fact be rigid, as when made of metal, although in practice it is preferred that the frame be made of plastic. In either case, the frame is about 2 mm thick and the tabs, rounded at their ends, are about 3 mm wide.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A system for display on a rod of a rack and storage in a case of cassette in boxes comprising a holder for at least one of said boxes, said holder being comprised of a flat sheet having a window for receiving a box, said box having a pair of holes in each end wall near a base of said box, each hole being formed by a U-shaped channel in the end wall extending past the inner surface of said base, and a pair of nibs protruding into said window from said holder at opposite sides, said opposite sides being selected to correspond to the ends of said box having said holes, whereby said nibs inserted into said holes will retain said box, said holder having a tab extending from one side, and said tab having a hole adapted to receive said rod for display on said rack, and a storage case having slots on two opposing sides for receiving said holder and holding said holder upright with the tab thereof extending upwardly for withdrawing said holder from said case.

2. A system as defined in claim 1 wherein one pair of said nibs are made longer than the other pair, and the other pair are made just long enough to pass into channels of said box while said box is in said holder and butted against the side of said window opposite said shorter pair of nibs, thereby facilitating the insertion of said nibs into said holes of said box by inserting first the longer pair and then the shorter pair.

* * * * *